United States Patent
Mukai et al.

(10) Patent No.: US 6,305,183 B1
(45) Date of Patent: Oct. 23, 2001

(54) APPARATUS AND METHOD FOR COOLING WORKPIECE

(75) Inventors: Ryohei Mukai, Nagoya; Hirohide Suzuki, Nisshin; Hideki Tamashima, Nagoya, all of (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/391,362

(22) Filed: Sep. 8, 1999

(30) Foreign Application Priority Data

Sep. 9, 1998 (JP) .................................. 10-255761
Jan. 27, 1999 (JP) .................................. 11-017771

(51) Int. Cl.$^7$ .............................. F25D 17/02; B24B 55/02
(52) U.S. Cl. ................................ 62/376; 62/64; 451/450; 451/7
(58) Field of Search ............................ 62/373, 376, 304, 62/64; 451/449, 450, 7

(56) References Cited

U.S. PATENT DOCUMENTS

| | | | |
|---|---|---|---|
| 5,494,134 | * 2/1996 | McConkey | 184/614 |
| 5,681,209 | * 10/1997 | Naumann et al. | 451/51 |
| 5,730,643 | * 3/1998 | Bartlett | 451/8 |
| 5,768,927 | * 6/1998 | Kajiwara et al. | 72/10.1 |
| 5,833,523 | * 11/1998 | Hykes | 451/450 |
| 6,083,084 | * 7/2000 | Yokogawa et al. | 451/53 |

FOREIGN PATENT DOCUMENTS

| | | |
|---|---|---|
| 52-124294 | 10/1977 | (JP) . |
| 58-4356 | 1/1983 | (JP) . |
| 59-176749 | 11/1984 | (JP) . |
| 61-146467 | 7/1986 | (JP) . |
| 01-164061 | 11/1989 | (JP) . |
| 10-86036 | 7/1998 | (JP) . |

* cited by examiner

Primary Examiner—William Doerrler
(74) Attorney, Agent, or Firm—Oblon, Spivak, McClelland, Maier & Neustadt, P.C.

(57) ABSTRACT

A cooling apparatus includes a lubricating fluid tank, a lubricating fluid nozzle, a lubricating fluid regulating device, a cooling fluid tank, a cooling fluid nozzle and a cooling fluid regulating device.

The cooling fluid nozzle supplies cooling fluid to the workpiece to enhance cooling effect of the cooling fluid. The lubricating fluid nozzle feeds lubricating fluid to the machining zone to prevent frictional heat generated in the machining zone from raising temperature of the workpiece. Since an appropriate amount of the lubricating fluid within the range helps the cooling effect of the cooling fluid, a quantity of the cooling fluid is reduced within the minimum range of the cooling fluid. A consumption of the lubricating fluid is much smaller than that of the cooling fluid. Therefore, a total amount of the fluids is extremely reduced.

The range of flow rates of the lubricating fluid has an upper limit that is preferably approximately 100.0 cm$^3$/h or smaller in 1.0 mm of a contacting length in the machining zone.

The range of flow rates of the cooling fluid has an upper limit that is preferably approximately 500.0 cm$^3$/min or smaller in 1.0 mm of a contacting length in the machining zone.

17 Claims, 12 Drawing Sheets

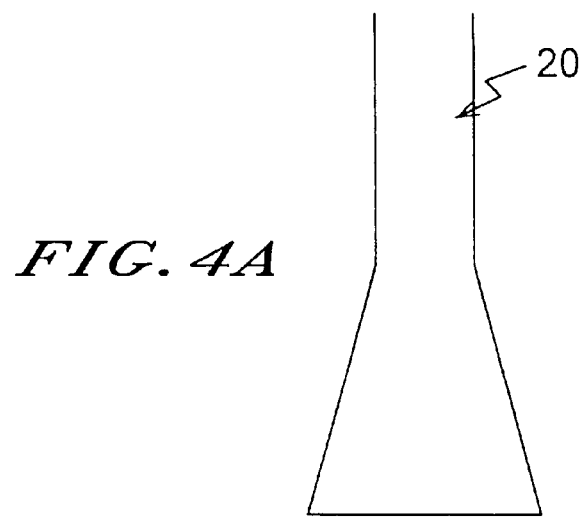
*FIG. 4A*
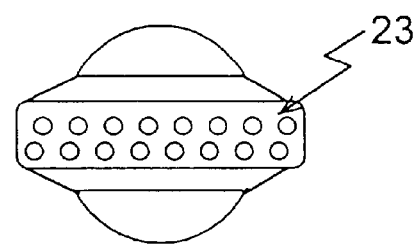
*FIG. 4B*
FIG. 5
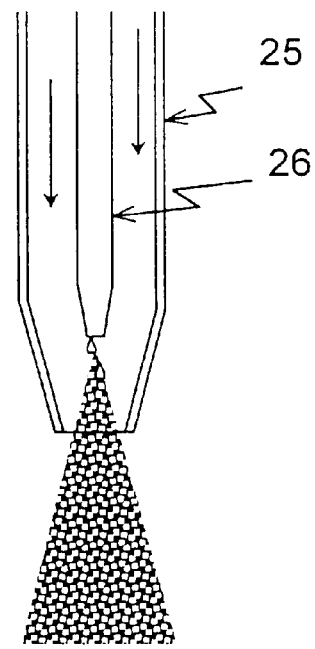

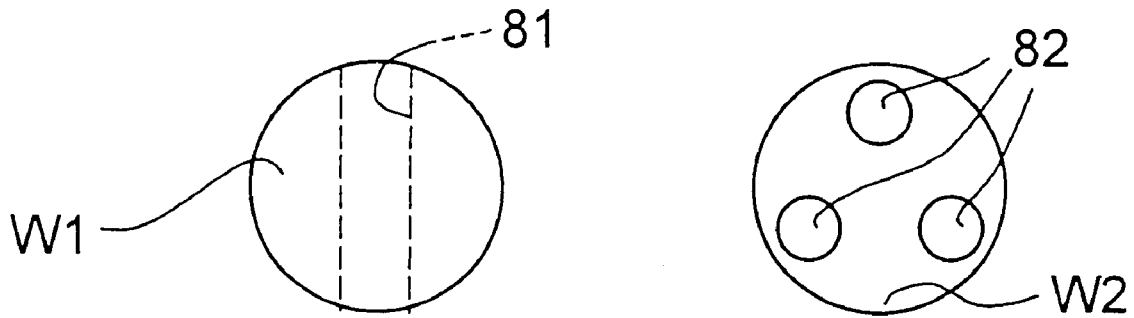
*FIG. 6A*  *FIG. 6B*
FIG. 7
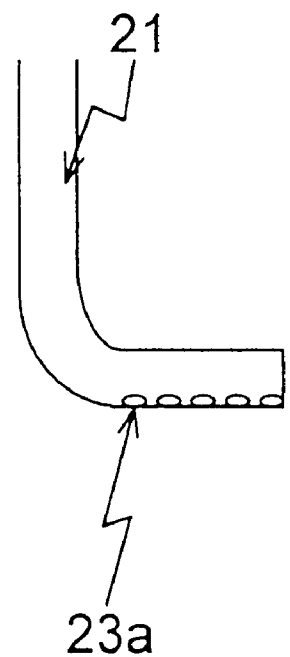

APPARATUS AND METHOD FOR COOLING WORKPIECE

BACKGROUND OF THE INVENTION

1. Field of the Invention

The present invention relates to an apparatus and a method for cooling a workpiece in machining such as grinding, dressing, cutting or the like.

2. Description of the Related Art

In machining, especially in grinding, coolant (i.e., grinding fluid) is supplied to a grinding zone between a grinding wheel and a workpiece to cool the machining zone in order to prevent grinding burn and to flush chips from the workpiece.

In the grinding, the coolant carried by high-speed rotation of the grinding wheel generates dynamic pressure at the grinding zone. The dynamic pressure tends to deflect the workpiece having a small diameter so as to decrease accuracy of the grinding, especially roundness of the workpiece is deteriorated. In the case of a workpiece having a recessed portion, e.g., a key way, an oil hole or the like, the recessed portion is possibly deformed after the grinding because the dynamic pressure changes at the recessed portion.

Moreover, the coolant carried by the rotation of the grinding wheel gives additional load to a motor driving the grinding wheel, so that power loss of the motor is increased.

On the other hand, cold-air-grinding is developed to improve working environment. The cold-air-grinding employs air refrigerated at 0° C. or lower instead of the coolant.

FIG. 1 shows one example of the cold-air-grinding including nozzles 30 and 31. The nozzle 30 supplies cold air to a grinding zone P between a grinding wheel G and a workpiece W, thus reduces temperature in the workpiece W. The nozzle 31 feeds lubricating oil to the grinding zone P to prevent friction in the grinding zone P.

However, cooling effect of the cold-air-grinding is insufficient compared with the grinding using the coolant because thermal capacity of the cold air is smaller than one of the coolant.

SUMMARY OF THE INVENTION

Accordingly, it is an object of the present invention to provide an improved apparatus and a method for cooling a workpiece to reduce quantities of fluids used in machining with securing sufficient cooling effect.

Briefly, this and other objects of this invention as hereinafter will become more readily apparent as having been attained broadly by a cooling apparatus including a lubricating fluid tank, a lubricating fluid nozzle, a lubricating fluid regulating device, a cooling fluid tank, a cooling fluid nozzle and a cooling fluid regulating device.

The lubricating fluid tank stores lubricating fluid.

The lubricating fluid nozzle connects with the lubricating fluid tank for supplying the lubricating fluid to machining zone between a tool and a workpiece.

The lubricating fluid regulating device manually or automatically regulates a flow rate of the lubricating fluid supplied to the lubricating fluid nozzle within a range of flow rates of the lubricating fluid.

The cooling fluid tank stores cooling fluid.

The cooling fluid nozzle connects with the cooling fluid tank to supply the cooling fluid to the workpiece.

The cooling fluid regulating device manually or automatically regulates a flow rate of the cooling fluid supplied to the cooling fluid nozzle within a range of flow rates of the cooling fluid while the lubricating fluid nozzle supplies the lubricating fluid within the range of flow rates of the lubricating fluid.

The cooling fluid nozzle supplies the cooling fluid to the workpiece to directly cool the workpiece so as to the cooling effect is enhanced. The lubricating fluid nozzle feeds the lubricating fluid to the machining zone to prevent frictional heat generated in the machining zone from raising temperature of the workpiece. Since an appropriate amount of the lubricating fluid within the range helps the cooling effect of the cooling fluid, a quantity of the cooling fluid is reduced within the minimum range of the cooling fluid. A consumption of the lubricating fluid is much smaller than that of the cooling fluid. Therefore, a total amount of the fluids is extremely reduced.

The range of flow rates of the lubricating fluid has an upper limit that is preferably approximately 100.0 cm$^3$/h or smaller in 1.0 mm of a contacting length in the machining zone.

The range of flow rates of the cooling fluid has an upper limit that is preferably approximately 500.0 cm$^3$/min or smaller in 1.0 mm of a contacting length in the machining zone.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 4(A) is a side view showing a head of a nozzle of the first embodiment;

FIG. 4(B) is a plan view showing the head of the FIG. 4(A);

FIG. 5 is a sectional side view showing a head of a mist nozzle of the first embodiment;

Figure 10:
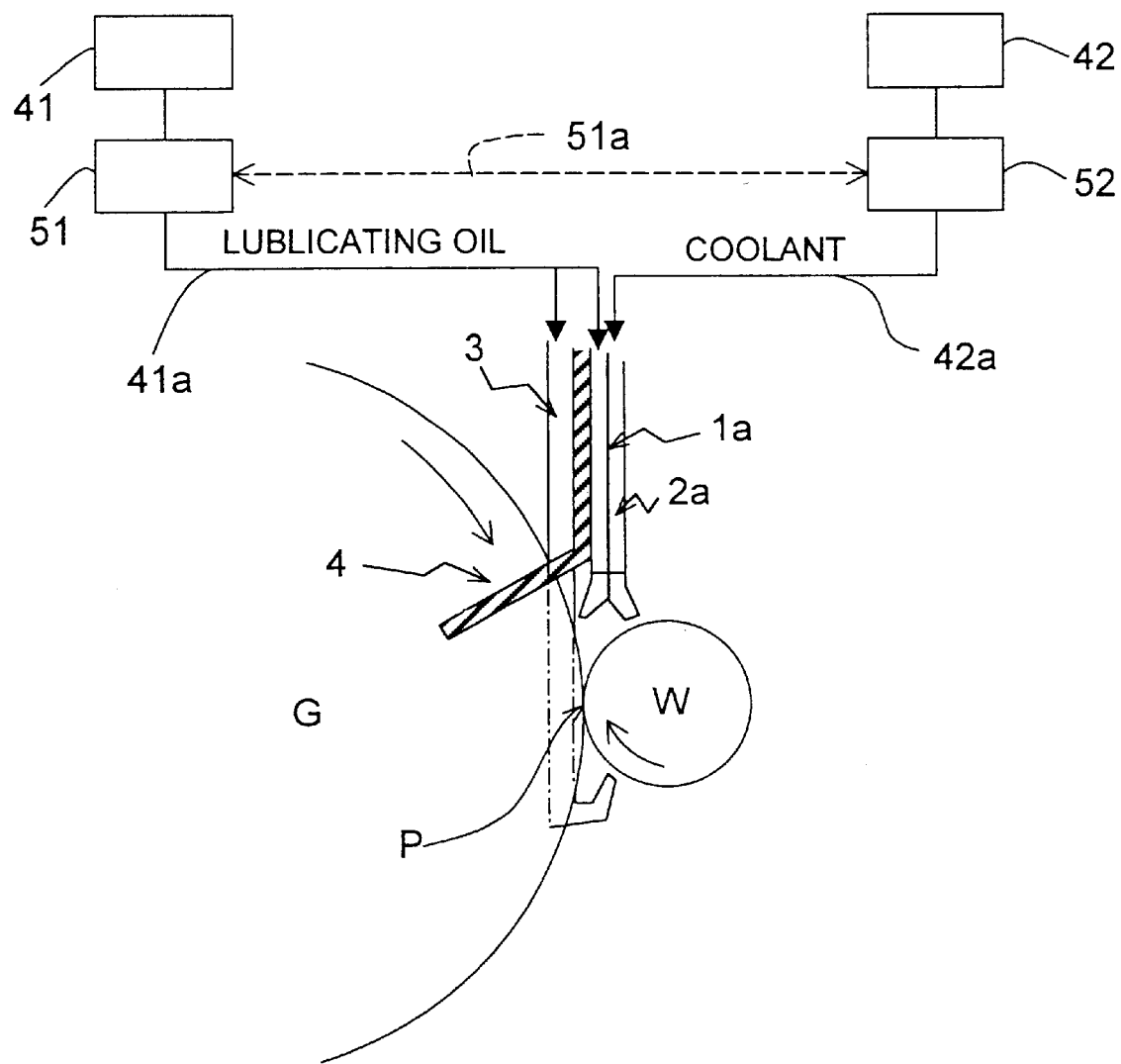
Figure 11:
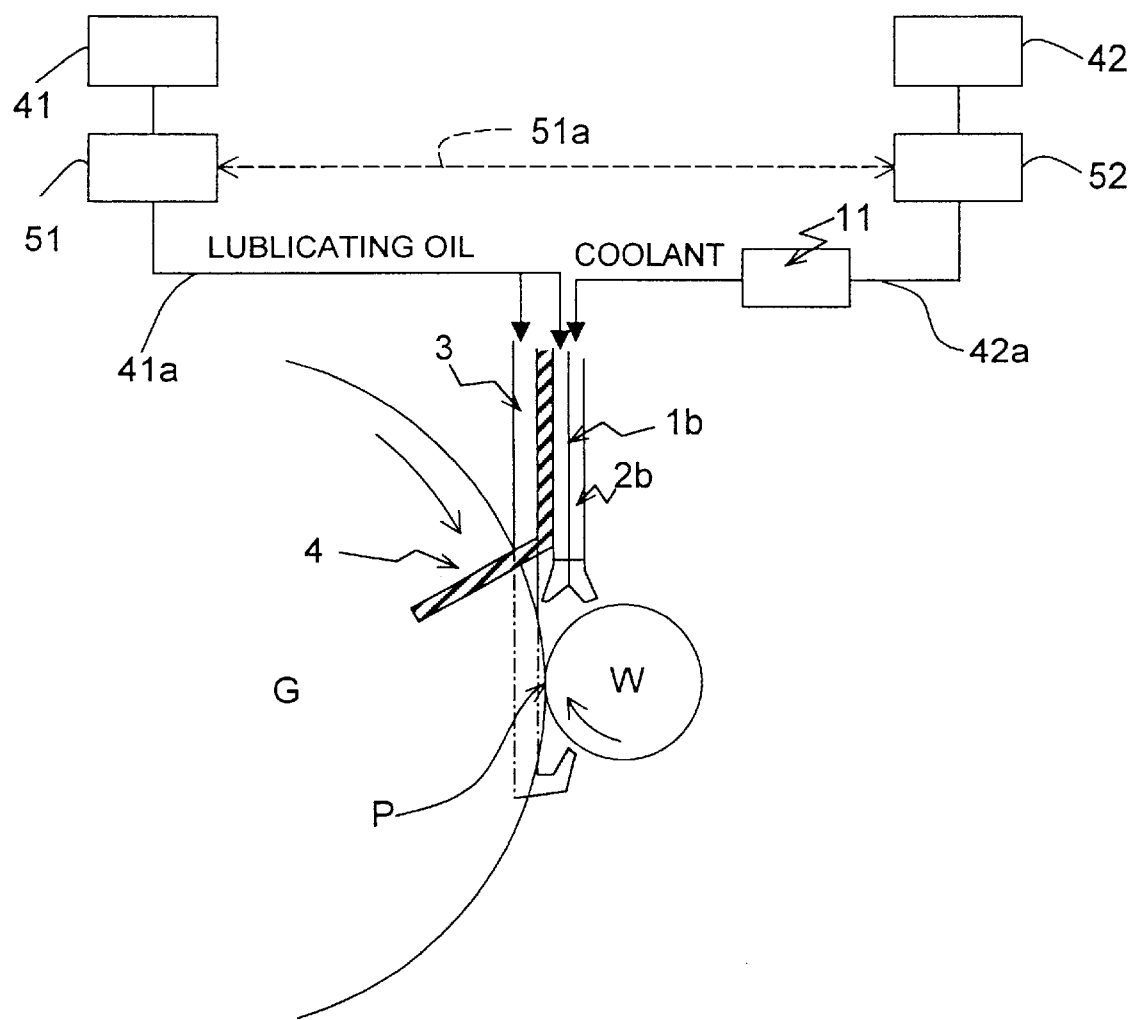
Figure 12:
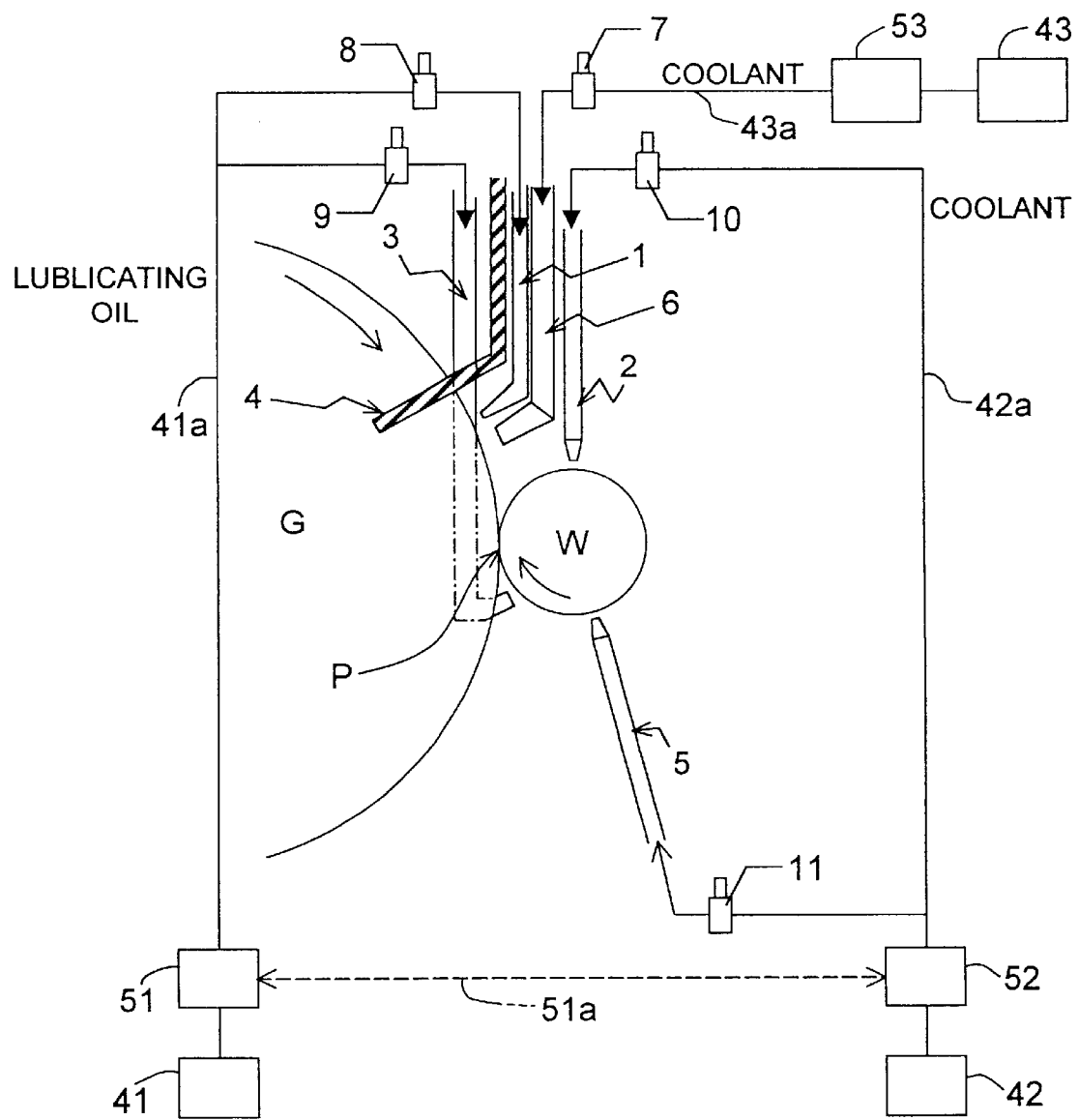
Figure 13:
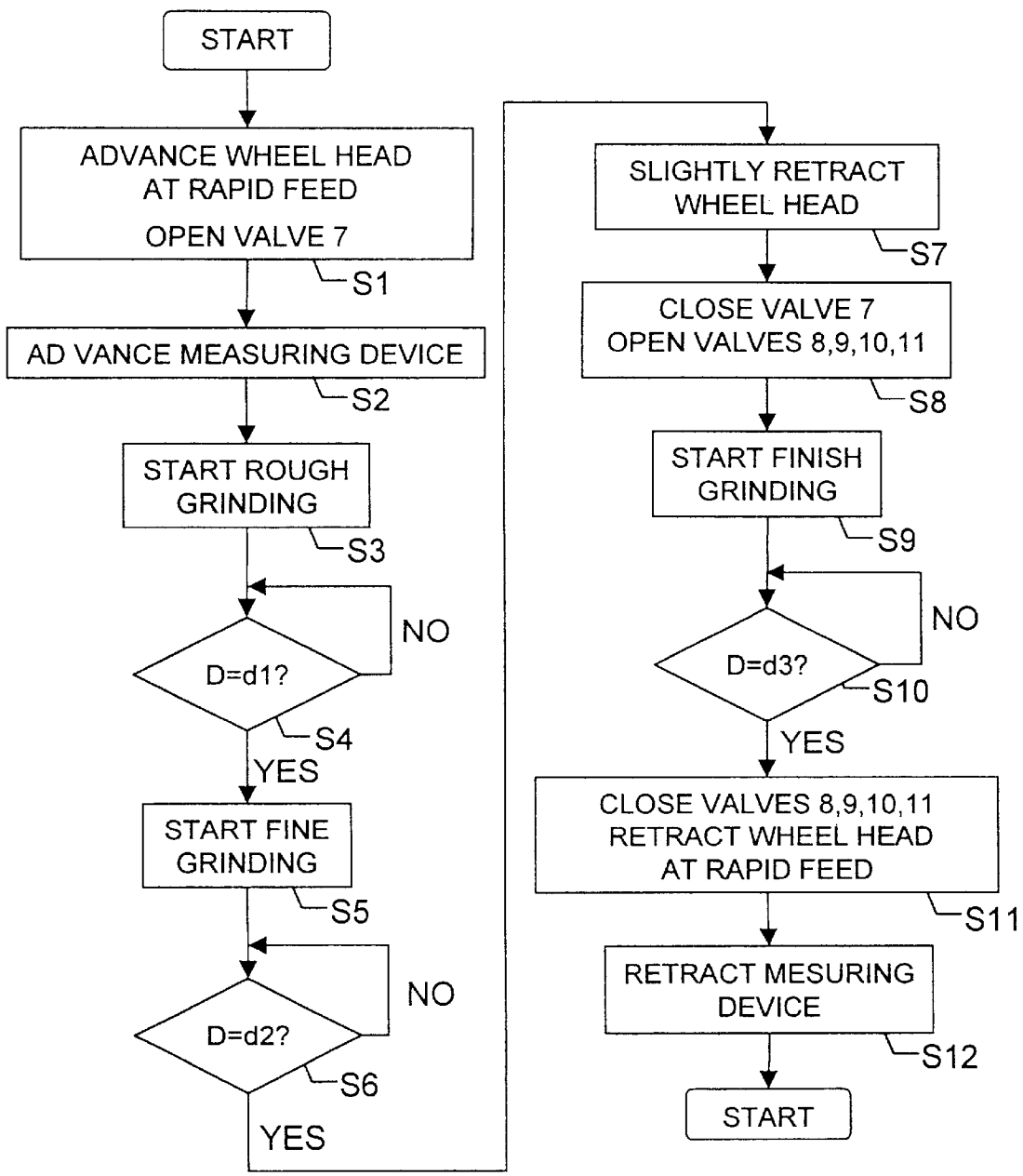
Figure 14A:
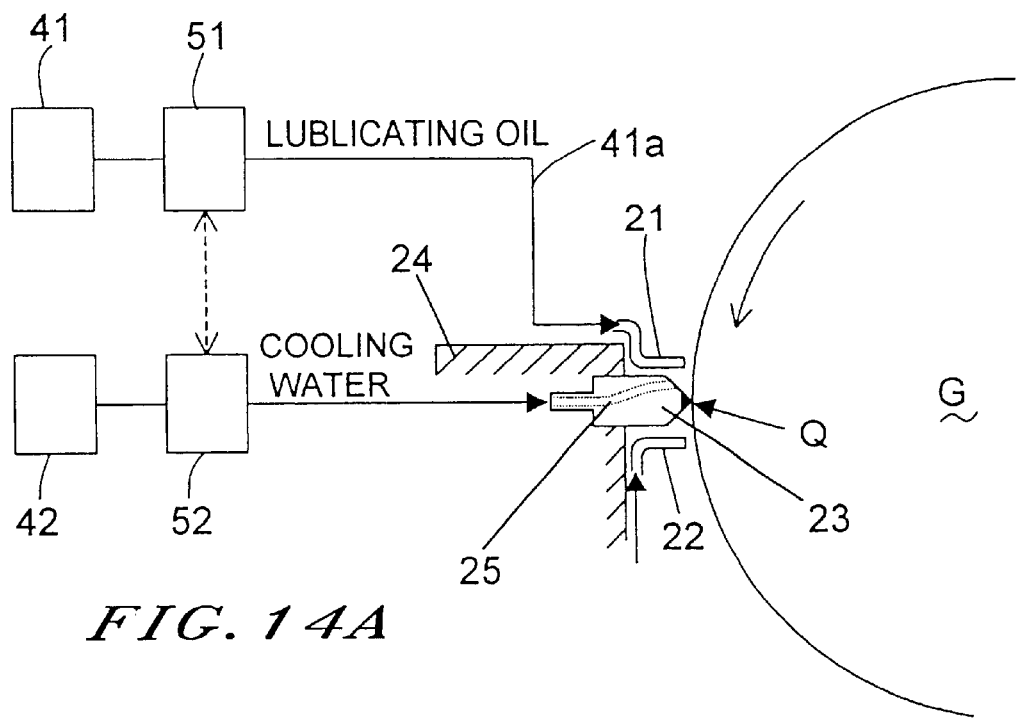
Figure 14B:
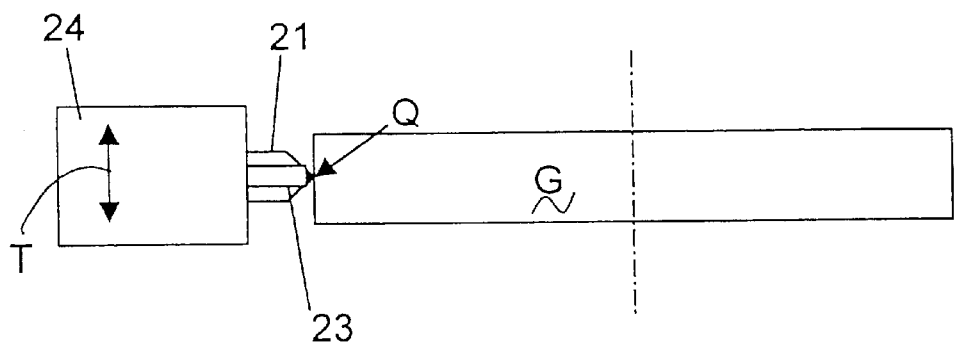

FIGS. 6(A) and (B) are side views showing workpieces;

FIG. 7 is a side view showing a head of a nozzle according to a modification of the nozzle shown in FIG. 4;

FIG. 8(A) is a front view showing a head of a nozzle according to another modification of the nozzle shown in FIG. 4;

FIG. 8(B) is a plan view showing the head of the FIG. 8(A);

FIG. 8(C) is a side view showing the head of the FIG. 8(A);

FIGS. 9(A), (B) and (C) are sectional side views showing heads of mist nozzles according to modifications of the nozzle shown in FIG. 5;

FIG. 10 is a side view showing a cooling apparatus according to a second embodiment of the present invention;

FIG. 11 is a side view showing a cooling apparatus according to a third embodiment of the present invention;

FIG. 12 is a side view showing a cooling apparatus according to a fourth embodiment of the present invention;

FIG. 13 is a flowchart showing process of the fourth embodiment;

FIG. 14(A) is a side view showing a cooling apparatus according to a fifth embodiment of the present invention; and FIG. 14(B) is a plan view showing the cooling apparatus of the fifth embodiment.

DETAILED DESCRIPTION OF THE PREFERRED EMBODIMENTS (First embodiment)

Figure 1:
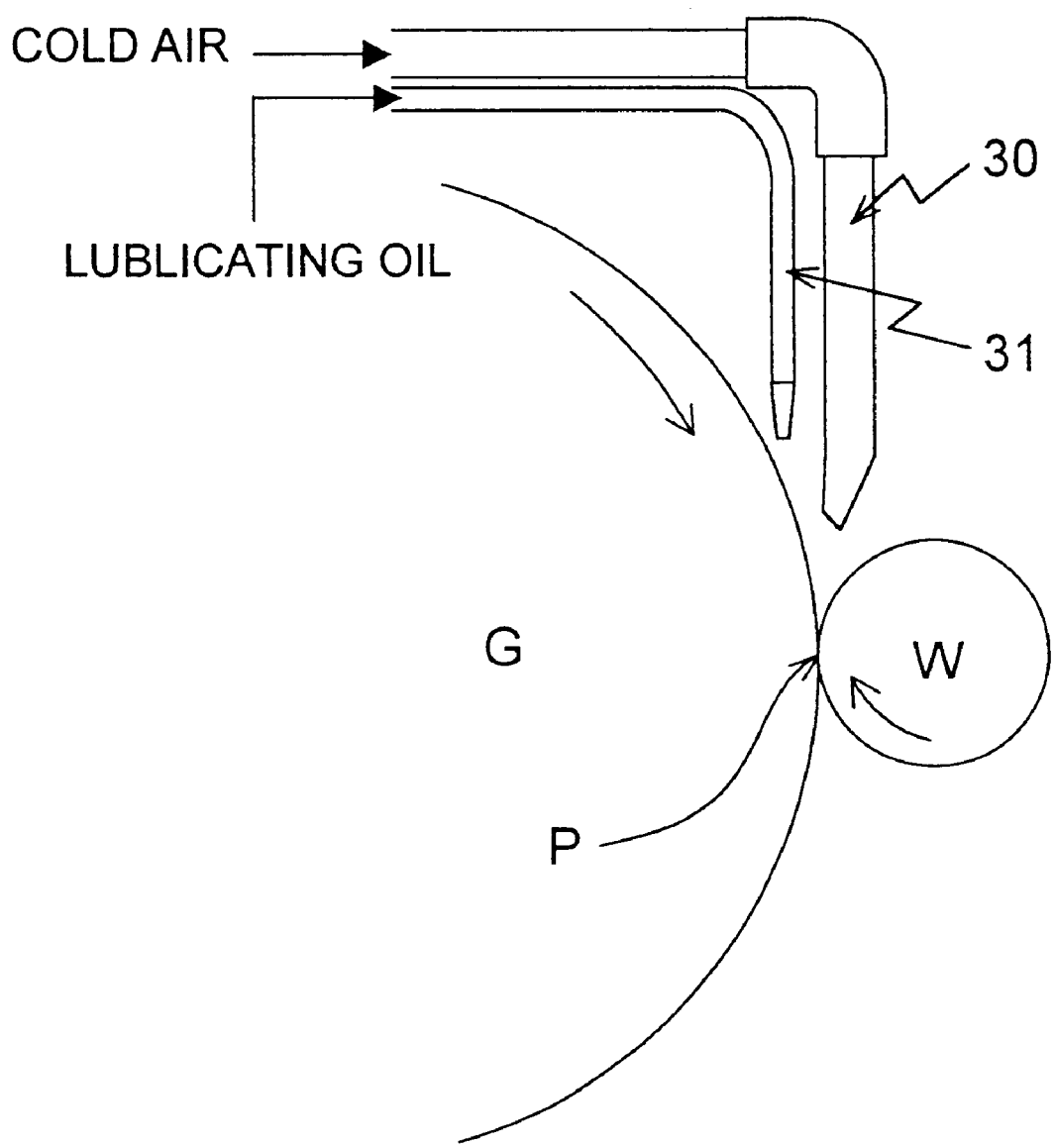
FIG. 1 is a side view showing conventional cooling apparatus according to a related art.
Figure 2:
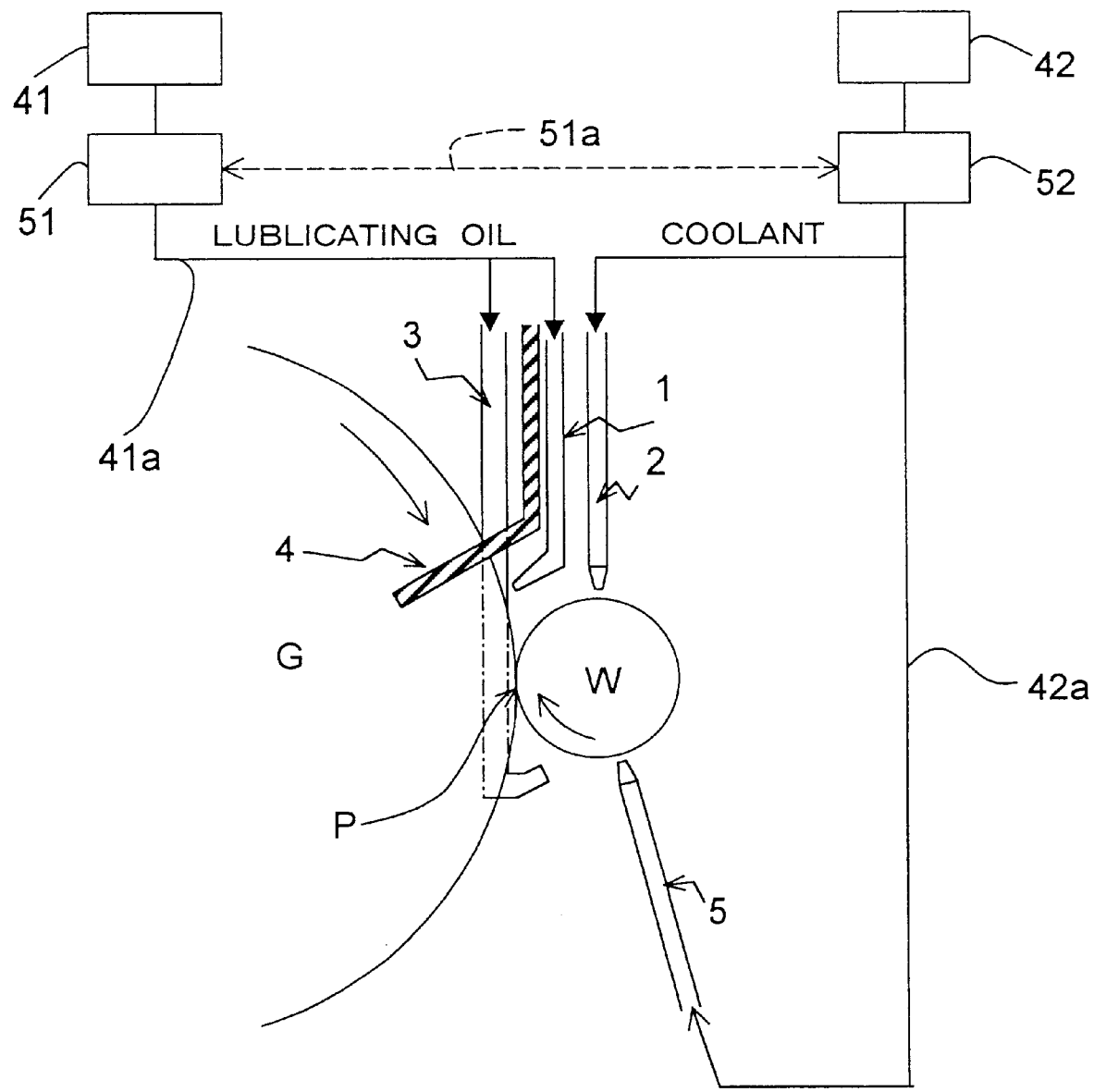
FIG. 2 is a side view showing a cooling apparatus according to a first embodiment of the present invention.

FIG. 2 shows a part of a grinding machine including cylindrical workpiece W, a grinding wheel G and a cooling apparatus having nozzles 1, 2, 3 and 5.

The workpiece W is driven clockwise in FIG. 2 by an unillustrated spindle. The first nozzle 1 and the third nozzle 3 are employed to supply lubricating oil, i.e., lubricating fluid, and the second nozzle 2 and the fourth nozzle 5 are used to feed coolant, i.e., cooling fluid.

The grinning wheel G is mounted on an unillustrated wheel head so as to be rotated against the workpiece W in the same rotational direction of the workpiece W. The grinding wheel G and the workpiece W contact with each other at a grinding zone P.

The first nozzle 1 and the third nozzle 3 connect with a lubricating oil tank 41 and a lubricating oil regulating device 51 through a passage 41a. The lubricating oil tank 41 stores the lubricating oil. Though the lubricating oil is preferably vegetable oil, another lubricating oil, e.g., animal oil, mineral oil or the like, is also used.

A head of the first nozzle 1 perpendicularly points an outer surface of the grinding wheel G in upstream of the grinding zone P in the rotation of the grinding wheel G. Thus the lubrication oil moves to the grinding zone P in accordance with the grinding wheel rotation.

On the other hand, a head to the third nozzle 3 points the outer surface of the workpiece W in upstream of the grinding zone P in the rotation of the workpiece W. Thus the lubrication oil moves to the grinding zone P in accordance with the workpiece rotation. The third nozzle 3 is auxiliary supply of the lubricating oil. Thus the third nozzle 3 can be omitted.

Figure 3:
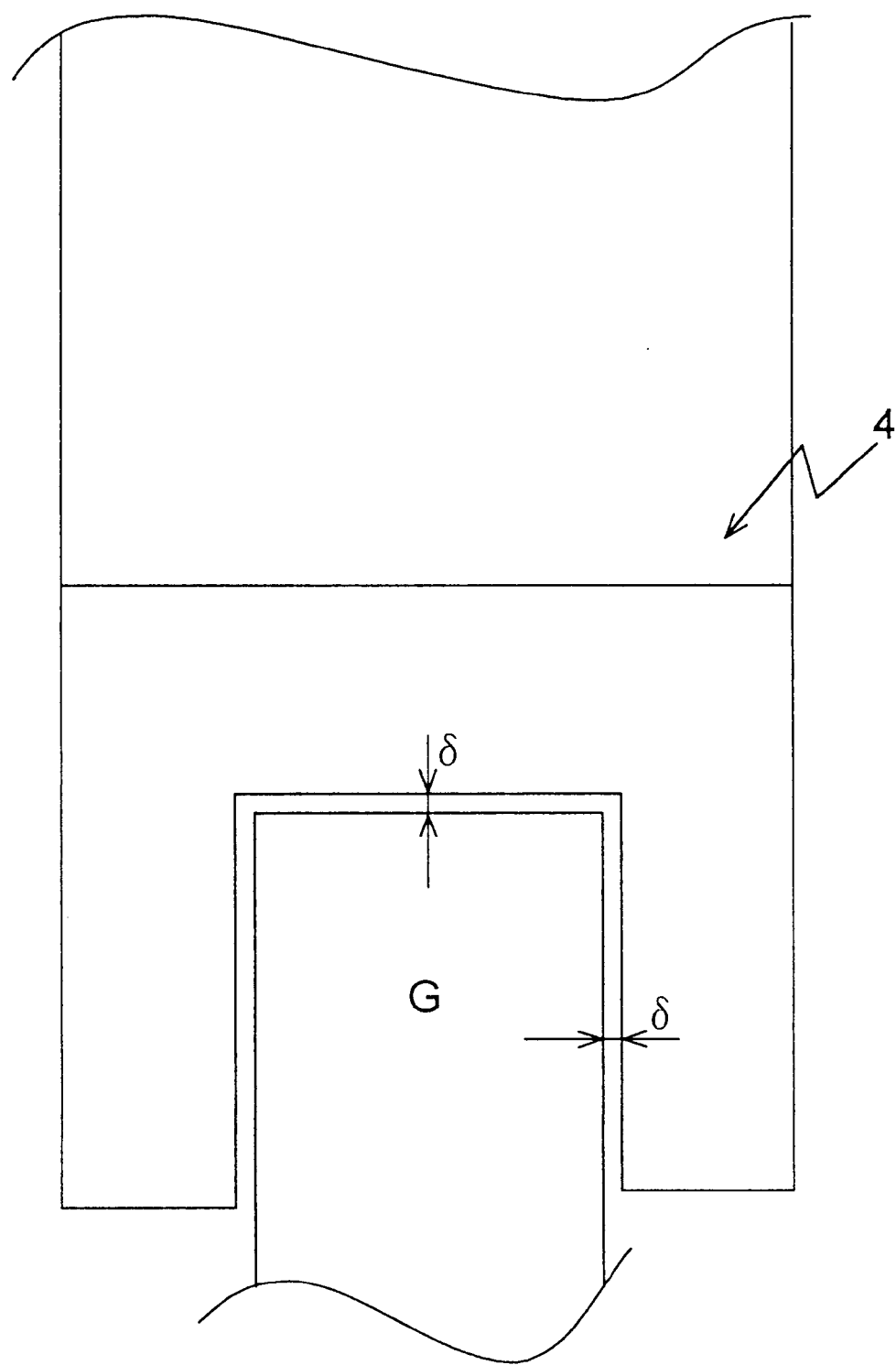
FIG. 3 is a top plan view showing a shield of the first embodiment.

As shown in FIGS. 2 and 3, a shield 4 surrounds the grinding wheel G with appropriate clearance δ and covers over the upstream of the first nozzle 1 in the rotational direction of the grinding wheel G. The shield 4 prevents air flow caused by rapid rotation of the grinding wheel G from blowing the lubricating oil of the first nozzle 1 away from the grinding zone P so as to ensure adhesion of lubricating oil to the face of the grinding wheel G.

An additional shield can be adopted for the third nozzle 3 to cover over the upstream of the third nozzle 3 in the rotational direction of the workpiece W.

The lubricating oil regulating device 51 manually or automatically regulates a flow rate of lubricating oil to one of following conditions L1, L2 and L3. In manual regulation, a worker or technician adjusts a handle of the lubricating oil regulating device 51 to regulate the flow rate of the lubricating oil. In the case of the automatic regulation, a microcomputer installed in the lubricating oil regulating device 51 adjusts the flow rate of the lubricating oil. The lubricating oil regulated by the lubricating oil regulating device 51 is supplied to the upstream of the grinding zone P.

The flow rate of the lubricating oil is chosen from the following conditions L1,L2 and L3. Each of the following conditions shows a flow rate in 1.0 mm (a millimeter) of contacting length between the grinding wheel G and the workpiece W in the grinding zone P.

L1) a flow rate from 10.0 to 100.0 $cm^3/h$ in continuous flow lubrication

L2) a flow rate from 1.0 to 10.0 $cm^3/h$ in drip-feed lubrication

L3) a flow rate from 0.1 to 10.0 $cm^3/h$ in mist lubrication in airflow with a flow rate from $1.0 \times 10^4$ to $1.0 \times 10^6$ $cm^3/min$ at room temperature or lower A flow rate larger than 100.0 $cm^3/h$ causes an excess of supply of the lubricating oil though lubricating effect is not changed. The flow rate of 10.0 $cm^3/h$ is an upper limit to keep the lubricating oil drips or mist state. The flow rate of 1.0 $cm^3/h$ is a lower limit to keep the lubricating oil drips state. It is considered that the flow rate smaller than 0.1 $cm^3/h$ is substantially not fit for practical use because it causes lack of the lubricating effect possibly generating a large amount of abrasion loss of the grinding wheel G.

Therefore, the flow rate of the lubricating oil substantially ranges from 0.1 to 100.0 $cm^3/h$ in 1.0 mm of contacting length between the grinding wheel G and the workpiece W in the grinding zone P. Especially, the mist lubrication of the condition L3 is preferable.

In the conditions L1 and L2, the first nozzle 1 adopts a head 20 shown in FIG. 4. As shown in FIG. 4 (A), the head 20 spreads to cover the grinding zone P in the axial direction of the workpiece W. The head 20 includes discharge holes 23 shown in FIG. 4 (B) to uniformly supply the lubricating oil to the grinding wheel G and the workpiece W in the grinding zone P.

In the conditions L3, the first nozzle 1 adopts a head 25 shown in FIG. 5 to generate the mist of the lubricating oil as an atomizer. The head 25 coaxially includes an inner nozzle 26 to supply the lubricating oil. Air blow passing through the head 25 atomizes the lubricating oil supplied from the inner nozzle 26.

Another type of the head of the first nozzle 1 also can be used to generate the mist of the lubricating oil.

The third nozzle 3 also adopts the same types of the heads as the heads 20 and 25 of the first nozzle 1 in the conditions L1 and L3. Thus explanation of the heads of the third nozzle 3 is omitted.

The third nozzle 3 does not adopts the drip-feed lubrication of the condition L2 because of the upward supply.

The second nozzle 2 and the fourth nozzle 5 connect with a coolant tank 42 and a coolant regulating device 52 through a passage 42a. The coolant tank 42 stores the coolant. The coolant supplied from the coolant supply device 42 is preferably water-based coolant to secure cooling effect of the workpiece W even when a small quantity of the coolant is supplied. For example, water-soluble types of coolant containing antitrust materials are preferably used. Another type of coolant is also adopted.

A head of the second nozzle 2 perpendicularly points the outer surface of the workpiece W in the normal direction of the workpiece W to directly supply the coolant to the workpiece W.

On the other hand, a head to the fourth nozzle 5 points the outer surface of the workpiece W to upwardly supply the coolant to the workpiece W. The fourth nozzle 5 is auxiliary supply of the coolant. Thus the fourth nozzle 5 can be omitted.

The coolant regulating device 52 manually or automatically regulates a flow rate of coolant to one of following conditions C1, C2 and C3. In manual regulation, a worker or technician adjusts a handle of the coolant regulating device 52 to regulate the flow rate of the coolant. In the case of the automatic regulation, a microcomputer installed in the coolant regulating device 52 adjusts the flow rate of the coolant.

The coolant regulated by the coolant regulating device 52 is supplied to the workpiece W.

By connecting the coolant regulating device 52 and the lubricating oil regulating device 51 through a communication cable 51a, the regulating devices 51 and 52 can input one another's data of the flow rates. In this case, the regulating devices 51 and 52 can adjust the flow rates to more suitable rates.

The flow rate of the coolant is chosen from the following conditions C1, C2 and C3. Each of the following conditions show a flow rate in 1.0 mm (a millimeter) of contacting length between the grinding wheel G and the workpiece W in the grinding zone P.

C1) a flow rate from 10.0 to 500.0 cm$^3$/min in continuous flow cooling

C2) a flow rate from 5.0 to 50.0 cm$^3$/min in drip-feed cooling

C3) a flow rate from 5.0 to 50.0 cm$^3$/min in mist cooling in the air flow rate from $1.0 \times 10^4$ to $1.0 \times 10^6$ cm$^3$/min at room temperature or lower A flow rate larger than 500.0 cm$^3$/min causes a large amount of scatter of the coolant. The flow rate of 50.0 cm$^3$/min is an upper limit to keep the coolant drips or mist state. It is considered that the flow rate smaller than 5.0 cm$^3$/min is substantially not fit for practical use because it causes lack of the cooling effect possibly generating thermal expansion of the workpiece W in the grinding so as to deteriorate roundness of the workpiece W after the grinding.

Therefore, the flow rate of the coolant substantially ranges from 5.0 to 500.0 cm$^3$/min in 1.0 mm of contacting length between the grinding wheel G and the workpiece W in the grinding zone P. Especially, the mist cooling in the condition C3 is preferable.

In the conditions C1 and C2, the head of the second nozzle 2 adopts the same type as the head 20 shown in FIG. 4. In the condition C3, the head of the second nozzle 2 employs the same type as the head 25 shown in FIG. 5.

On the other hand, the head of the fourth nozzle 5 adopts the same type as the head 20 shown in FIG. 4 in the conditions C1. The fourth nozzle 5 does not adopts the drip-feed cooling of the condition C2 because of the upward supply. In the conditions C3, the head of the fourth nozzle 5 employs the same type as the head 25 shown in FIG. 5.

Thus detail explanation of the heads of the second nozzle 2 and the fourth nozzle 5 is omitted.

As described above, the flow rate of the lubricating oil preferably ranges from 0.1 to 100.0 cm$^3$/h in 1.0 mm of contacting length between the grinding wheel G and the workpiece W in the grinding zone P. The flow rate of the coolant are suitably arranged from 5.0 to 500.0 cm$^3$/min in 1.0 mm of contacting length between the grinding wheel G and the workpiece W in the grinding zone P.

The combination of the lubricating oil and the coolant in the above limits shows dramatic decrease of the fluid because the effective usage of the lubricating oil minimizes the amount of coolant. The decrease of the quantities of the fluids reduces the scatter of the fluids and gas generated by high temperature in the grinding so as to improve working environment.

Effluent of the coolant is also decreased, so that the chips flushed by the coolant are easily recycled from the coolant effluent.

The minimized fluid supply reduces dynamic pressure generated by the fluid carried by the high-speed rotation of the grinding wheel G at the grinding zone P. Therefore, grinding accuracy, e.g. roundness, is enhanced.

Moreover, the shortage of the fluid amount minimizes additional load of a motor driving the grinding wheel G to reduce power loss of the motor.

In the case that the supply of the lubricating oil is smaller than 0.1 cm$^3$/h, the lubricating oil insufficiently reduces the friction in the grinding zone P. In the same way, the shortage of the coolant, smaller than 5.0 cm$^3$/min, insufficiently reduces the temperature of the workpiece W. These shortages of the fluids possibly cause grinding seizure.

The following experiments #1 to #6 shown in Table 1 were performed to determine cooling effect of the embodiment described above compared with conventional ways.

Each of the experiments #1 to #6 employed three kinds of tests.

To measure abrasion loss of the grinding wheel G, an total amount of grinding of 12,800 mm$^3$ was performed by grinding about 105 workpieces.

To gauge roundness of finished workpieces W, two kinds of workpieces W1 and W2 were ground. As shown in FIG. 6(A), the workpiece W1 had an oil hole 81 in the diametrical direction of the workpiece W1 to represent a workpiece tending to cause deflection by effect of the dynamic pressure of the coolant in grinding. The workpiece W2 in FIG. 6(B) included three through holes 82 in the axial direction of the workpiece W2 to represent a workpiece easily defected by heat generated in grinding.

Each of the workpieces in the three tests was a cylindrical chromium-molybdenum steel.

The experiments #1, #2, #3 and #6 employed the same water-soluble coolant containing antitrust materials at room temperature.

The experiments #4 and #6 adopted the same vegetable lubricating oil at room temperature.

The experiment #1 of Table 1 shows a conventional cooling supplying a large amount of the coolant with flow rate of 1000.0 cm$^3$/min in 1.0 mm of contacting length between the grinding wheel G and the workpiece W in the grinding zone P. The coolant indicated to the grinding zone P in continuous flow.

Each of results of the experiment #1 is expressed by numeral 1 in Table 1 as a reference value.

The experiment #2 shows a cooling supplying only a small amount of the coolant with flow rate of 10.0 cm$^3$/min in 1.0 mm of contacting length of the grinding zone P. The coolant indicated to the grinding zone P.

The result of the experiment #2 in the abrasion loss of the grinding wheel G was about twice the reference value because of the decrease of the coolant. The roundness of the workpieces W1 was enhanced since the dynamic pressure of the coolant decreased. The roundness of the workpieces W2 was slightly deteriorated. Therefore, the cooling of the experiment #2 was not fit for practical use due to the deterioration of the abrasion loss.

The experiment #3 also shows a cooling supplying only a small amount of the coolant with flow rate of 10.0 cm$^3$/min in 1.0 mm of the contacting length of the grinding zone P. However, the coolant only directed to the workpiece W.

The result of the experiment #3 was basically the same as those of the experiment #2. Therefore, the cooling of the experiment #3 was not fit for practical use due to the deterioration of the abrasion loss.

The experiment #4 shows cooling supplying only a small amount of the lubricating oil with flow rate of 1.0 cm$^3$/h in 1.0 mm of the contacting length of the grinding zone P. The lubricating oil indicated to the grinding zone P as is the same as the first nozzle 1.

The result of the experiment #4 in the abrasion loss of the grinding wheel G was decreased to 0.67 and the roundness of the workpieces W1 was enhanced. However, the roundness of the workpieces W2 was considerably deteriorated because the lubricating oil was not enable to cool the workpiece enough so that the workpieces W2 was deflected by the frictional heat. Therefore, the cooling of the experiment #4 was not fit for practical use due to the generation of the frictional heat.

The experiment #5 shows a cooling supplying cold air at a temperature of −30° C. and with a flow rate of $100.0 \times 10^3$ $cm^3$/min in 1.0 mm of the contacting length of the grinding zone P. The lubricating oil indicated to the grinding zone P as is the same as the first nozzle 1.

The abrasion loss of the grinding wheel G and the roundness of the workpieces W1 in the experiment #5 were enhanced to the same values as those of the experiment #4. However, the roundness of the workpieces W2 was also considerably deteriorated because the cooling was insufficient so that the frictional heat deflected the workpieces W2. This is because thermal capacity of air is smaller than one of the coolant, thus the cooling air does not effectively cool the workpiece compared with the coolant.

The experiment #6 of Table 1 shows a cooling representing the first embodiment of this invention shown in FIG. 2. The small amount of the lubricating oil was supplied with flow rate of 1.0 $cm^3$/h in 1.0 mm of the contacting length between the grinding wheel G and the workpiece W in the grinding zone P. The lubricating oil supplied from the first nozzle 1 indicated to the grinding zone P in the mist lubrication.

Moreover, the small amount of the coolant was supplied with flow rate of 10.0 $cm^3$/min in 1.0 mm of contacting length in the grinding zone P. The coolant supplied from the second nozzle 2 indicated to the in the workpiece W in continuous flow cooling.

The third nozzle 3 and the fourth nozzle 5 were not used in the experiment #6.

The result of the experiment #6 in the abrasion loss of the grinding wheel G was enhanced to be substantially equivalent to those of the experiments #4 and #5. The roundness of the workpiece W1 was enhanced to be substantially equal to those of the experiments #2 and #3. The roundness of the workpiece W2 was almost same as the experiments #2 and #3.

The roundness of the workpiece W2 was slightly deteriorated compared with the experiment #1. However, it is considered that the cooling apparatus can obtain a roundness of the workpiece W2 same as that of the experiment #1 when grinding time is slightly decreased, e.g., a feed rate of the grinding wheel G is reduced. Thus, the cooling apparatus of the experiment #6 is fit for practical use.

Therefore, the cooling apparatus of the first embodiment enhances the abrasion loss of the grinding wheel G and the roundness and the workpiece W in spite of the decrease of the coolant.

TABLE 1

| | | Abrasion loss of Grinding Wheel G | Roundness of Workpiece W1 | Roundness of Workpiece W2 |
|---|---|---|---|---|
| #1 | Coolant (to grinding zone P) 1000.0 $cm^3$/min in 1.0 mm | 1 | 1 | 1 |
| #2 | Coolant (to grinding zone P) 10.0 $cm^3$/min in 1.0 mm | 2 | 0.2 | 12 |
| #3 | Coolant (to workpiece W) 10.0 $cm^3$/min in 1.0 mm | 2 | 0.2 | 12 |
| #4 | Mist lubrication (to grinding zone P) 1.0 $cm^3$/h in 1.0 mm | 0.67 | 0.2 | 40 |
| #5 | Cold air (to grinding zone P) $100.0 \times 10^3$ $cm^3$/min in 1.0 mm | 0.67 | 0.2 | 22 |

TABLE 1-continued

| | | Abrasion loss of Grinding Wheel G | Roundness of Workpiece W1 | Roundness of Workpiece W2 |
|---|---|---|---|---|
| #6 | Mist lubrication (to grinding zone P) 1.0 $cm^3$/h in 1.0 mm Coolant (to workpiece W) 10.0 $cm^3$/min in 1.0 mm | 0.67 | 0.2 | 12 |

Figure 8:
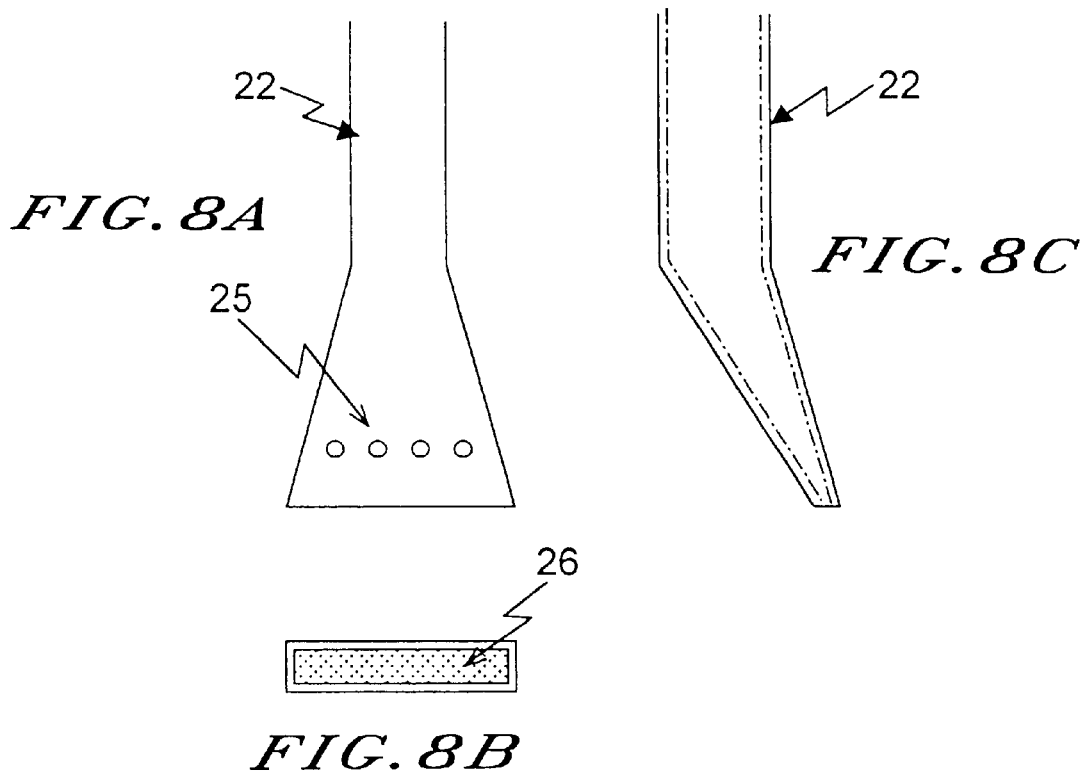

FIGS. 7 and 8 show modifications of the head 20 of FIG. 4.

A head 21 of FIG. 7 is formed by bending a nozzle end to cover the grinding zone P. Discharge holes 23a are arranged on a bottom surface of the bent nozzle end.

A head 22 of FIG. 8 includes air inlet holes 25 formed in a side surface of the head 22. In addition, an end of the head 22 is inclined as shown in FIG. 8(C). Flow of the fluid (the lubricating oil or the coolant) passing in the nozzle leads air from the air inlet holes 25, so that the fluid foams onto the grinding zone P to prevent scatter of the fluid. Moreover, the supply of the head 22 uniformly covers a wide range of the grinding zone P.

In the case of a filter 26 formed on an end of the head 22 shown in FIG. 8(B) as discharge holes, the filter 26 makes the fluid foam smaller so as to enhance the prevention of the scatter of the fluid.

Figure 9:
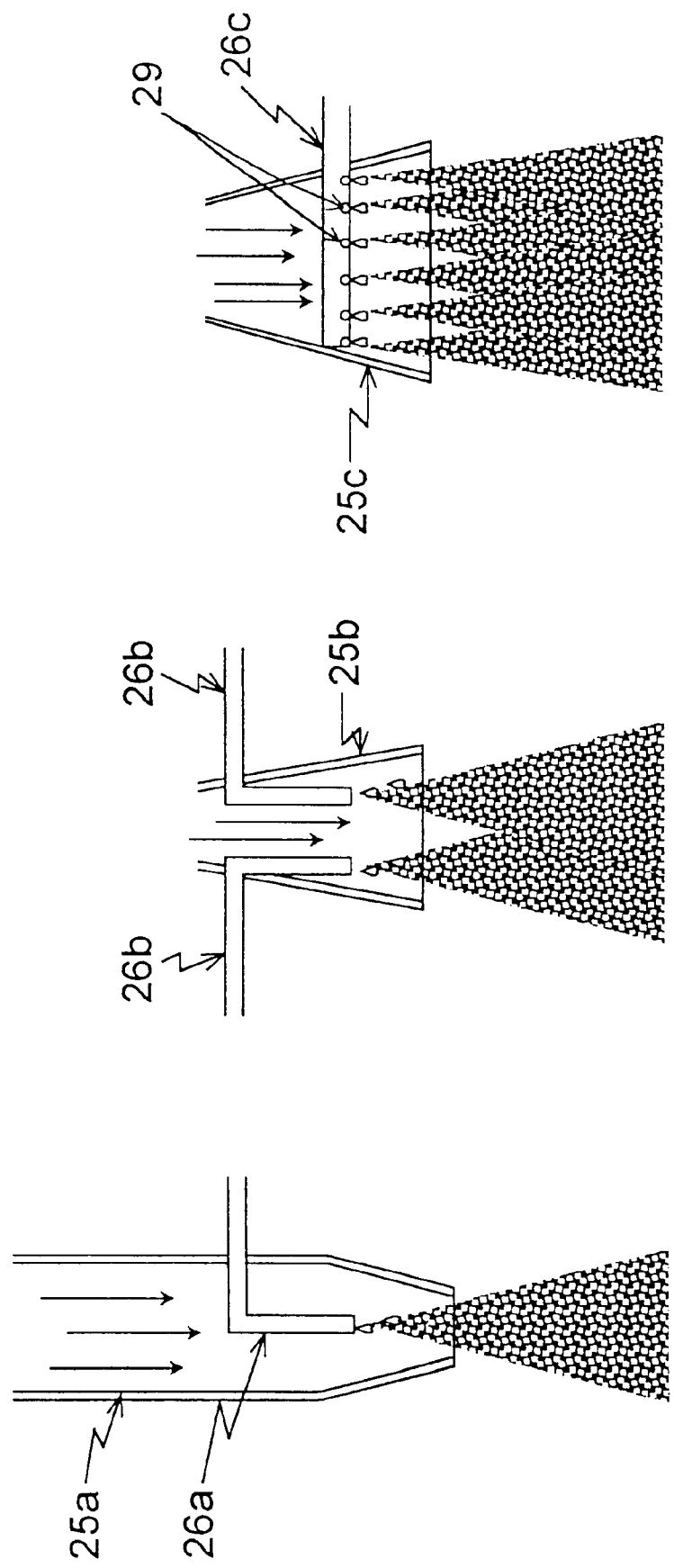

FIG. 9 shows modifications of the head 25 of FIG. 5 to atomize the fluid (the lubricating oil or the coolant).

A head 25a of FIG. 9(A) includes an inner nozzle 26a to supply the lubricating oil. The inner nozzle 26a is inserted into the head 25a at an end portion of the head 25a.

A head 25b of FIG. 9(B) includes a plurality of inner nozzles 26b.

A head 25c of FIG. 9(C) includes an inner nozzle 26c having a plurality of discharge holes 29 to supply the fluid. (Second embodiment)

FIG. 10 shows the second embodiment. Since the construction of the second embodiment is substantially the same as that of the first embodiment, the second embodiment is described with using the reference numbers of the first embodiment and the descriptions of the same parts are omitted.

The second embodiment includes three nozzles 1a, 2a and 3. The fourth nozzle 5 of the first embodiment is omitted.

The first nozzle 1a and the third nozzle 3 connect with a lubricating oil tank 41 and a lubricating oil regulating device 51 through a passage 41a to supply lubricating oil.

The second nozzle 2a connects with a coolant tank 42 and a coolant regulating device 52 through a passage 42a to supply coolant to a workpiece W.

The first nozzle 1a is united to the second nozzle 2a.

A head of the second nozzle 2a points the outer surface of the workpiece W in the tangential direction of the workpiece W to directly supply the coolant to the workpiece W.
(Third embodiment)

FIG. 11 shows the third embodiment. Since the construction of the third embodiment is substantially the same as that of the first embodiment, the third embodiment is described with using the reference numbers of the first embodiment and the descriptions of the same parts are omitted.

The third embodiment includes three nozzles 1b, 2b and 3. The fourth nozzle 5 of the first embodiment is omitted.

The first nozzle 1b and the third nozzle 3 connect with a lubricating oil tank 41 and a lubricating oil regulating device 51 through a passage 41a to supply lubricating oil.

The first nozzle 1b is united to the second nozzle 2b.

A head of the second nozzle 2b points the outer surface of the workpiece W in the tangential direction of the workpiece W to directly supply the coolant to the workpiece W.

The second nozzle 2b connects with a coolant tank 42, a coolant regulating device 52 and a cooler 11 through a passage 42a to supply coolant to a workpiece W. The cooler 11 refrigerates the coolant discharged from the coolant regulating device 52. The cooler 11 enhances the cooling effect of the coolant, so as to reduce a quantity of the coolant supplied to the workpiece W.

The cooler 11 adopts refrigerant gas or a vortex tube that cooling air passes through. Another type of the cooler 11 also can be used. The temperature of the refrigerated coolant is preferably kept at room temperature or lower. For example, water-soluble types of coolant are preferably maintained around 5° C. Moreover, antifreeze coolant is preferably used to prevent the coolant from freezing.

(Fourth embodiment)

FIG. 12 shows the fourth embodiment. Since the construction of the fourth embodiment is based on the first embodiment, the fourth embodiment is described using the reference numbers of the first embodiment and the descriptions of the same parts are omitted.

The fourth embodiment includes an additional nozzle 6, i.e., a fifth nozzle 6, to supply larger quantities of coolant (grinding fluid) to grinding zone P in rough grinding and fine grinding. The minimized coolant supply from nozzles 2 and 5 performs in finish grinding.

The fifth nozzle 6 connects with an additional coolant tank 43 and an additional coolant regulating device 53 through a passage 43a to regulate quantities of the coolant supplied to the workpiece W.

The additional coolant tank 43 stores the same coolant as that of the coolant tank 42. Thus the coolant supplied from the fifth nozzle 6 is the same as the coolant discharged from the nozzles 2 and 5, though different coolant can be used.

The additional coolant regulating device 53 is basically the same as the coolant regulating device 52. However, the coolant regulating device 53 adjust a flow rate of the fifth nozzle 6 much larger than those of the nozzles 2 and 5 adjusted by the coolant regulating device 52. In this case, the flow rate of the fifth nozzle 6 is at least twice as many as those of the nozzles 2 and 5.

A head of the fifth nozzle 6 perpendicularly points an outer surface of the grinding wheel G in upstream of the grinding zone P in rotation of the grinding wheel G. The fifth nozzle 6 can supply the coolant to another portion. For example, the head of the fifth nozzle 6 directly points the grinding zone P.

Each of the nozzles 1, 2, 3, 5 and 6 respectively includes electromagnetic valves 8, 10, 9, 11 and 7 in this order for switching supply and stop of the fluids.

FIG. 13 shows a flowchart of a method of the supplying the fluids in the fourth embodiment.

When a grinding operation starts in response to a start command, an unillustrated wheel head supporting the grinding wheel G advances to workpiece W at rapid feed rate, and the electromagnetic valve 7 opens to supply the coolant from the fifth nozzle 6 (step S1). The coolant with predetermined large flow rate is supplied to the upstream of the grinding zone P.

Next, an unillustrated measuring device advances to the workpiece W to gauge a size of the workpiece W (step S2).

Then, the rough grinding starts (step S3). The rough grinding progresses until the measuring device detects a first sizing signal dl showing the rough grinding is completed (step S4).

After that, the feed rate is reduced to fine grinding feed rate so that the fine grinding starts (step S5). The fine grinding progresses until the measuring device detects a second sizing signal d2 showing the fine grinding is completed (step S6).

The wheel head stops in response to the second sizing signal d2 so as to retract the wheel head in the backward direction to a predetermined position (step S7). The retraction of the wheel head prevents excess grinding generated by elastic recovery of the workpiece W after the coolant stops in a successive step S8 because the workpiece W in the grinding is deflected by dynamic pressure of the large amount of the coolant from the fifth nozzle 6.

In the step S8, the electromagnetic valve 7 closes to stop the coolant supplied from the fifth nozzle 6, and the electromagnetic valves 8, 9, 10 and 11 open. Thus small quantities of the lubricating oil are supplied from the first nozzle 1 and the third nozzle 3 to the upstream of the grinding zone P, and the minimized quantities of coolant is discharged from the second nozzle 2 and the fourth nozzle 5 to the workpiece W.

After that finish grinding starts (step S9).

The finish grinding progresses until the measuring device detects a third sizing signal d3 showing the finish grinding is completed (step S10).

The electromagnetic valves 8, 9, 10 and 11 close in response to the third sizing signal d3 so as to stop supplying the lubricating oil and the coolant, and the wheel head retracts from the workpiece W to the start position at rapid feed rate (step S11).

Finally, the measuring device retracts to the original position (step S12).

In the fourth embodiment, though the minimized fluid supplies from the nozzles 1, 2, 3 and 5 start after the fine grinding, those small quantities supplies can act after the rough grinding.

(Fifth embodiment)

FIG. 14 shows the fifth embodiment to describe dressing of a grinding wheel G by a dresser 23.

A small quantity of lubricating oil (lubricating fluid) is supplied to the grinding wheel G as a workpiece. A minimized amount of cooling water (cooling fluid) is fed to dressing point Q where the dresser 23, i.e., a machining tool, contacts with the grinding wheel G.

The dresser 23 is mounted on a dresser support 24. A lubricant nozzle 21 is arranged on the dresser support 24 in the upper part of the dresser 23 to supply the lubricating oil. A head of the lubricant nozzle 21 points an outer surface of the grinding wheel G in upstream of the dressing point Q in rotation of the grinding wheel G. Thus the lubrication oil moves to the dressing point Q in accordance with the grinding wheel rotation.

The dresser 23 includes a through hole 25 formed in the dresser 23. The through hole 25 penetrates to the upper part of the dressing point Q, so that the cooling water supplied from the through hole 25 covers a tip of the dresser 23. Since the cooling water passes through the hole 25, the dresser 23 is effectively cooled from the inside of it.

An auxiliary nozzle 22 can be mounted on the dresser support 24 in the lower part of the dresser 23 to supply the cooling water or air in order to remove chips from the grinding wheel G.

When the dresser 23 relatively traverses the rotating grinding wheel G in the direction T in FIG. 14(B) in the dressing, the lubricant nozzle 21 supplies the lubricating oil to the upstream of the dressing point Q in the rotation of the grinding wheel G. The through hole 25 feeds the cooling water to the dresser 23.

The flow rate of the lubricating oil preferably ranges from 0.1 to 100.0 $cm^{3/h\ in}$ 1.0 mm (a millimeter) of contacting length between the dresser 23 and the grinding wheel G at the dressing point Q. The flow rate of the cooling water is suitably arranged from 5.0 to 500.0 $cm^{3/min\ in}$ 1.0 mm of contacting length between the dresser 23 and the grinding wheel G at the dressing point Q.

In addition, the flow rate of mist lubrication can range from 0.1 to 10.0 $cm^3/h$ in 1.0 mm of the contacting length at the dressing point Q. The flow rate of mist cooling can be arranged from 5.0 to 50.0 cm³/min in 1.0 mm of the contacting length at the dressing point Q.

In the fifth embodiment, since the lubricant nozzle 23 and the through hole 25 (and auxiliary nozzle 22) move with the dresser 23, the lubricating oil and the cooling water are effectively supplied to the dressing point Q and the dresser itself.

The minimized supplies of the lubricating oil and the cooling water reduce scatter of cooling water and gas generated by high temperature in the dressing so as to improve working environment.

Another through hole can be formed to supply the lubricating oil instead of the lubricant nozzle 21. Moreover, another nozzle can be arranged on the dresser support 24 to feed the cooling fluid to the dresser 23 instead of the through hole 25.

Though the fifth embodiment shows the single-point dressing with the dresser 23, rotary dressing and crushing roll dressing also can employ the above mentioned cooling apparatus.

The fifth embodiment is not only applied for the dressing but also applied for tooling.

The above embodiments concern the grinding operations. However, these embodiments are also applied to another type of machining, e.g., cutting.

Obviously, numerous modifications and variations of the present invention are possible in light of the above teachings. It is therefore to be understood that within the scope of the appended claims, the present invention may be practiced otherwise than as specifically described herein.

What is claimed is:

1. A cooling apparatus comprising:
    a lubricating fluid tank storing lubricating fluid;
    a lubricating fluid nozzle connected with said lubricating fluid tank for supplying the lubricating fluid to machining zone between a tool and a workpiece;
    a lubricating fluid regulating device configured to regulate a flow rate of the lubricating fluid supplied to said lubricating fluid nozzle within a range of flow rates of the lubricating fluid;
    a cooling fluid tank storing cooling fluid;
    a cooling fluid nozzle connected with said cooling fluid tank to supply the cooling fluid to the workpiece; and
    a cooling fluid regulating device configured to regulate a flow rate of the cooling fluid supplied to said cooling fluid nozzle within a range of flow rates of the cooling fluid while said lubricating fluid nozzle supplies the lubricating fluid within said range of flow rates of the lubricating fluid, said range of flow rates of the cooling fluid has an upper limit that is approximately 500.0 cm³/min or smaller in 1.0 mm of a contacting length in the machining zone.

2. A cooling apparatus according to claim 1, wherein said range of flow rates of the lubricating fluid has an upper limit that is approximately 100.0 cm³/h or smaller in 1.0 mm of a contacting length in the machining zone.

3. A cooling apparatus according to claim 2, wherein said range of flow rates of the lubricating fluid has a lower limit that is approximately 0.1 cm³/h or larger in 1.0 mm of a contacting length in the machining zone.

4. A cooling apparatus according to claim 1, wherein said range of flow rates of the lubricating fluid is approximately from 1.0 to 10.0 cm³/h in 1.0 mm of a contacting length in the machining zone in drip-feed lubrication.

5. A cooling apparatus according to claim 1, wherein said range of flow rates of the lubricating fluid is approximately from 0.1 to 10.0 cm³/min in 1.0 mm of a contacting length in the machining zone in mist lubrication.

6. A cooling apparatus according to claim 1, wherein said range of flow rates of the cooling fluid has a lower limit that is approximately 5.0 cm³/min or larger in 1.0 mm of a contacting length in the machining zone.

7. A cooling apparatus according to claim 1, wherein said range of flow rates of the cooling fluid is approximately from 5.0 to 50.0 cm³/min in 1.0 mm of a contacting length in the machining zone in one of drip-feed cooling and mist cooling.

8. A cooling apparatus according to claim 1, wherein said lubricating fluid nozzle supplies the lubricating fluid to an outer surface of the tool at an upstream of the machining zone in a rotational direction of the tool and/or to an outer surface of the work at an upstream of the machining zone in a rotational direction of the workpiece.

9. A cooling apparatus according to claim 1, wherein the tool is a grinding wheel.

10. A cooling apparatus according to claim 9, further comprising a shield surrounding the grinding wheel with clearance and covering an upstream of said lubricating fluid nozzle in a rotational direction of the grinding wheel.

11. A cooling apparatus according to claim 9, further comprising an additional nozzle configured to supply cooling fluid to the machining zone when grinding operation is in at least one of rough grinding and fine grinding, a flow rate of cooling fluid supplied from said additional nozzle is larger than said flow rate of said cooling fluid nozzle.

12. A cooling apparatus according to claim 1, further comprising a cooler configured to refrigerate the cooling fluid.

13. A cooling apparatus according to claim 1, wherein the lubricating fluid is taken from the group consigning of vegetable oil, animal oil and mineral oil.

14. A cooling apparatus according to claim 1, wherein the cooling fluid is a water-soluble type of coolant containing antitrust material.

15. A cooling apparatus according to claim 1, wherein the tool is a dresser and said cooling fluid nozzle is formed in the dresser.

16. A method of cooling a workpiece comprising the steps of:
    supplying cooling fluid to grinding zone between a grinding wheel and a workpiece in at least one of rough grinding and fine grinding with a flow rate larger than 500.0 cm³/min in 1.0 mm of a contacting length in the grinding zone;
    supplying cooling fluid to the workpiece in at least finish grinding with a flow rate of approximately 500.0 cm³/min or smaller in 1.0 mm of a contacting length in the grinding zone; and
    supplying lubricating fluid to the grinding zone in at least finish grinding with a flow rate of approximately 100.0 cm³/h or smaller in 1.0 mm of a contacting length in the grinding zone.

17. A cooling apparatus comprising:
    a cooling fluid tank storing cooling fluid;
    a cooling fluid nozzle connected with said cooling fluid tank to supply the cooling fluid to a workpiece;
    a cooling fluid regulating device configured to regulate a flow rate of the cooling fluid supplied to said cooling fluid nozzle;
    a lubricating fluid tank storing lubricating fluid;
    a lubricating fluid nozzle connected with said lubricating fluid tank for supplying the lubricating fluid to machining zone between a tool and the workpiece; and
    a lubricating fluid regulating device configured to discharge the lubricating fluid so as to restrict the flow rate of the cooling fluid to approximately 500.0 cm³/min or smaller in 1.0 mm of a contacting length in the machining zone.

* * * * *